United States Patent Office 3,763,234
Patented Oct. 2, 1973

3,763,234
PREPARATION OF AMIDES
William F. Brill, Skillman, N.J., assignor to Halcon
International, Inc.
No Drawing. Filed Dec. 3, 1970, Ser. No. 94,970
Int. Cl. C07c 103/30, 103/31, 103/76
U.S. Cl. 260—558 P                                    8 Claims

ABSTRACT OF THE DISCLOSURE

N-substituted amides are prepared by reacting an ester of a carboxylic acid with a primary or secondary amine in the presence of a Lewis acid.

This invention relates to the preparation of amides and is more particularly concerned with a process for producing amides by the aminolysis of esters.

Amides are a well-known class of compounds and they can be prepared by various methods such as the reaction of an acid chloride with ammonia or an amine, the partial hydrolysis of nitriles, aminolysis of esters, and the like. The synthetic route involving the aminolysis of an ester is useful for producing a variety of amides but this procedure generally gives low conversions to the desired product unless it is catalyzed. Various catalysts have been proposed, but they vary greatly in effectiveness and some have the disadvantage of being relatively expensive.

It is an object of this invention to provide an improved method for the preparation of amides by the aminolysis of esters.

It has been discovered that the reaction between esters and amines to form amides is effectively catalyzed by Lewis acids and the process of this invention accordingly comprises the use of Lewis acids as catalysts in the preparation of amides by the reaction of an amine and an ester. The Lewis acids appear to have a unique activity in catalyzing this reaction.

The esters which may be employed in the process of this invention include the alkyl or aryl esters of aromatic carboxylic acids containing up to 12 carbon atoms, particularly the lower alkyl esters, i.e. those containing ester groups having up to 6 carbon atoms, and the alkyl and aryl esters of alkanoic acids, i.e. acids containing up to 6 carbon atoms, and especially the lower alkyl esters of lower alkanoic acids. The acids may be either monocarboxylic or polycarboxylic, e.g. dicarboxylic, acids. Esters of aromatic and alkanoic acids which may be employed in the process of this invention include methyl acetate, ethyl acetate, butyl acetate, methyl propionate, methyl valerate, propyl caprylate, methyl pelargonate, phenyl acetate, methyl benzoate, propyl benzoate, phenyl benzoate, methyl laurate, butyl stearate, octyl butyrate, dimethyl adipate, dimethyl terephthalate, and the like.

Amines suitable for reaction with the ester in the process of this invention are primary and secondary amines, i.e. compounds having one or more primary or secondary amino groups, preferably primary amines, including monoamines, diamines, triamines, etc. Suitable amines include compounds of the general formula

R—NH—R′ wherein R is an organic radical, e.g. an alkyl group, an aryl group, or an aralkyl group, the alkyl group containing up to 32 carbon atoms, preferably up to 12 carbon atoms, and the aryl or aralkyl groups, which include a benzene or a naphthalene neucleus substituted by alkyl radicals or aryl or aralkyl radicals, preferably containing up to 15 carbon atoms. The alkyl group may be acyclic and of straight chain or branched structure, or it may be alicyclic. The R group may be interrupted by a hetero atom linkage, such as O or S, and may contain one or more primary or secondary amino groups. In the foregoing formula, R′ is preferably hydrogen but it may be an alkyl, aryl, or aralkyl group, as defined for R, and may be the same as R or it may be different from R in a given compound. When R and R′ are alkyl groups they may be joined together to form a heterocyclic link with the nitrogen atom to which they are attached. R and R′ may also be substituted by non-interfering groups such as alkoxy, halo, and amido groups, and the like. One class of amines of the foregoing formula comprises diamines of the formula $H_2N-A-NH_2$, where A is an organic radical corresponding to R, e.g. an alkylene, arylene, or aralkylene radical, which may include hetero atom linkages. Examples of typical amines which may be used in the process of this invention include methyl amine, n-butyl amine, octyl amine, tetramethylene diamine, hexamethylene diamine, dibutyl amine, aniline, toluidine (o-, m-, or p-), 2,4 - xylidine, 3,4 - xylidine, 2,5-xylidine, 4 - ethylaniline, 3 - propylaniline, 1,3 - diaminobenzene, 2,4-diaminotoluene, 4,4′ - diamino - diphenyl methane, p-chloro aniline, 2,6 - diamino toluene, 4,4′ - diamino-diphenyl, 2,4,4′ - triamino diphenyl ether, 2,6 - diamino naphthalene, 1,5 - diamino - 2 - methylpentane, benzyl amino, phenylethyl amine, piperidine, morpholine, piperazine, glycine, phenylalanine, phenoxyethyl amine, ethoxyethyl amine, 2 - methoxy - 5 - chloro-aniline, 2-amino ethyl ether, 2-amino ethyl sulphide, cyclohexyl amine, and the like. Also included are amino-terminated polymers such as polyamines, e.g. polymeric compounds produced by condensation polymerization of aliphatic diamines, and the like, suitably containing up to 100 amino groups or more. It will be understood from the foregoing that the amine which is reacted with the ester in accordance with the present invention may be of varied form and the amine needs only to be characterized as a primary or secondary amino compound, suitably having no interfering groups such as nitro groups. However, the preferred amino compounds are aromatic amines and the preferred esters are the lower alkyl esters.

As indicated above, the process of the present invention is characterized by the use of Lewis acids as catalysts. Lewis acids are well-known compounds and are defined, for example, in "Physical Organic Chemistry" by Jack Hine (1962—McGraw-Hill Company, New York) and in "Friedel-Crafts & Related Reactions" by George A. Olah, volume I, (1963—Interscience Publishers, New York). Some examples of Lewis acids include antimony trichloride, aluminium chloride, antimony trifluoride, ferric chloride, antimony pentachloride, niobium pentachloride, tantalum tetrachloride, titanium tetrachloride, boron trifluoride, antimony pentafluoride, stannic fluoride, aluminum bromide, thallium trichloride, uranyl nitrate, uranium tetrachloride, uranium oxides, e.g. $UO_2$, and the like. Additional examples of Lewis acids are found in "Friedel-Crafts & Related Reactions," referred to above, this publication being concerned primarily with Lewis acids of the salt type.

Preferred Lewis acids for use as catalysts in the process of this invention are those which are compounds of metals of Groups III–VIII of the Periodic Table, especially Groups V and VI, particularly the metals having atomic weights about 120. In general, the preferred Lewis acids are salts, e.g. halides, and the Lewis acids which have been found to be of particular utility and suitability are those which are compounds of uranium, including uranyl compounds, i.e. compounds containing the $UO_2{++}$  radical, especially the salts, e.g. uranium tetrachloride, uranyl chloride, uranyl nitrate, uranyl acetate, and the like.

When the amine and/or the ester is normally solid at room temperature, it is desirable that a solvent be employed. Suitable solvents are the usual inert organic compounds used as solvents in organic syntheses, such as aromatic hydrocarbons, e.g. benzene, toluene, xylene, and the like, aliphatic hydrocarbons such as hexane, octane, dodecane, and the like, halogenated aliphatic hydrocarbons, such as 1,1,2 - trichloroethane, 1,2,2 - trifluoroethane, and the like, halogenated aromatic hydrocarbons, such as monochlorobenzene, dichlorobenzene, trichlorobenzene, and the like, ethers such as dibutyl ether, dioxane, ethylene glycol disoamyl ether, diethyleneglycol diethyl ether, and the like, and similar inert organic solvents. When at least one of the reactants is normally liquid at room temperature, it is generally not necessary to use a solvent, since the liquid reactant can usually serve as a solvent for the solid reactant, although an inert organic solvent may be employed if it is found that it facilitates the handling of the particular reaction medium.

It is a feature of the invention, and one of its advantages, that the reaction between the ester and the amine proceeds smoothly at moderately elevated temperatures, e.g. temperatures of 20 to 150° C., and there is no need for high temperatures to be used. Preferably a temperature within the range of 80 to 110° C. is employed. It will be understood, however, that more elevated temperatures can be employed if desired, e.g. temperatures up to 250° C. and above, but temperatures should be below those at which decomposition of a reactant or a reaction product occurs. Pressure is not a parameter of the process and the operation may ordinarily be carried out at atmospheric pressure. However, super atmospheric pressures may be employed if desired in cases in which one or more of the reactants is relatively low boiling but, ordinarily, pressures greater than two atmospheres are not necessary.

Although the reaction can be carried out with stoichiometric quantities of the reactants, one of the reactants may be in excess. While the amount of excess reactant may vary, it is preferred that the excess be limited to a maximum of 50 mols, preferably 15 mols, of the reactant in excess per mol of the other reactant.

The amount of Lewis acid catalyst employed can vary, and even very small amounts are effective to catalyze the reaction. However, it is generally desirable to use at least about .005 mol percent of Lewis acid based on the quantity of reactant which is present at most in stoichiometric quantity, i.e. which is not in excess. The maximum amounts of Lewis acid used will generally be determined by economic considerations and as a general rule there is no particular advantage in using amounts greater than 25 mol percent. The optimum amount of catalyst will vary with reaction conditions and with the particular Lewis acid used but ordinarily it is advantageous to use from 0.1 to 10 mol percent of the Lewis acid, preferably 0.5 to 10%.

The reaction between the amine and the ester in the presence of Lewis acid, in accordance with the invention, may be carried out in any convenient reaction vessel and, if super atmospheric pressures are to be employed, the vessel is suitably constructed to withstand the maximum pressure to be employed. The reaction is ordinarily conducted by introducing the two reactants and the catalyst into the reaction vessel and then heating the reactant mixture at the desired reaction temperature for a suitable period of time. The reaction time may vary over a wide range, e.g. 0.1 to 48 hours, or longer, and the time of the reaction is not a critical aspect of the process.

Ordinarily, reaction times longer than 1 hour are more preferred but there is generally no advantage, from the standpoint of amide formation, in reaction times greater than 24 hours. The reaction may be carried out batchwise or it may be carried out continuously. Indeed, one of the features of the process is that it lends itself to continuous operation by reason of the fact that all of the reactants in the appropriate proportions can be introduced together into the system.

The reaction between the ester and the amine in accordance with the invention results in the concurrent release of the alcohol corresponding to the ester group and, since the presence of such alcohol generally tends to inhibit the reaction, it is preferred that the released alcohol be removed from the system. This can best be done by providing the reaction vessel with a fractional distillation column and by carrying the reaction out at the reflux temperature of the reactant mixture. In this way the alcohol may be removed overhead continuously, or intermittently, as desired. Alternatively, the reaction may be initially carried out below the reflux temperature and then heated to the reflux temperature when it is desired to remove the alcohol and to accelerate the reaction.

The following specific examples of practical application will serve to provide a fuller appreciation of the invention, but it is to be understood that these examples are given by way of illustration only and are not to be construed as limitative of the invention.

EXAMPLE I

Into a 50 ml. flask fitted to a Vigreux column, are charged 13.6 g. methyl benzoate, 9.3 g. aniline and 0.5 g. uranyl chloride. The solution is refluxed (pot temperature 185° C.) through the column and methanol is removed overhead. After two hours the reaction is stopped, and the reaction solution cooled. There is obtained 3.5 g. of N-phenyl benzamide.

EXAMPLE II

Following the procedure and using the apparatus described in Example I, the flask is charged with 19.4 g. dimethyl terephthalate, 6 g. ethylene diamine and 0.5 g. uranyl nitrate. The solution is refluxed (pot temperature 100° C.) and methanol is removed overhead. After 1 hour the reaction is stopped and the solid diamide (20 g.) is washed with chloroform and recovered.

EXAMPLE III

Following the procedure of Example I, except that the reaction is carried out at 80° C. without alcohol removal, various esters and amines are reacted with Lewis acid catalysts. The data for these experiments are shown in Table I below. In the table, results of control experiments carried out under the same conditions, but without the Lewis acid catalysts, are also shown. The letter N indicates that no detectable product was formed in the control experiment while the letter L indicates that some product was formed but in characteristically lesser quantity. In each case, except where otherwise indicated, the ester and the amine are used in 1:1 mol ratio, and 0.05 mol of catalyst per mol of ester is employed.

TABLE I

| Ester | Amine | Catalyst | Time, hrs. | Product | Control |
|---|---|---|---|---|---|
| Methyl butyrate | Aniline | $UO_2Cl_2$ | 17 | N-phenyl butyramide | N |
| Butyl acetate | do | $UCl_4$ | 35 | Acetanilide | N |
| Phenyl acetate | do | $UCl_4$ | 17 | ....do.... | N |
| Methyl acetate | do | $UO_2(NO_3)_2 \cdot 4H_2O$ | 31 | ....do.... | L |
| Do.[1] | do | $SbCl_3$ | 119 | ....do.... | L |
| Do.[1] | do | $UCl_4$ | 35 | ....do.... | L |
| Methyl butyrate | Butyl amine | $UCl_4$ | 17 | N-butyl butyramide | L |
| Methyl acetate | do | $UO_2Cl_2$ | 4 | N-butyl acetamide | L |

[1] Mol ratio ester/amine=5:2.

What is claimed is:

1. A process for producing an amide which comprises reacting a carboxylic acid ester with a primary or secondary amine in the presence of a Lewis acid catalyst, said ester being an alkyl or aryl ester of a monocarboxylic or poly-carboxylic aromatic or alkanoic acid containing up to 12 carbon atoms, said amine being an alkyl, aryl or aralkyl primary or secondary amine containing up to 32 carbon atoms in the case of an alkyl amine and containing up to 15 carbon atoms in the case of an aryl or aralkyl amine, and said Lewis acid being a halide of antimony, aluminum, iron, niobium, tantalum, titanium, boron, tin or thallium, a uranium tetrahalide, uranyl halide, uranyl nitrate, uranyl acetate, or uranium dioxide.

2. A process as defined in claim 1, wherein said ester is an alkyl ester.

3. A process as defined in claim 1, wherein said amine is an aryl amine.

4. A process as defined in claim 1, wherein said catalyst is a uranium tetrahalide, uranyl halide, uranyl nitrate, uranyl acetate, or uranium dioxide.

5. A process as defined in claim 1, wherein said ester is an alkyl ester, said amine is an aryl amide and said catalyst is a uranium tetrahalide, uranyl halide, uranyl nitrate, uranyl acetate, or uranium dioxide.

6. A process as defined in claim 1, wherein said ester is used in an amount which is in excess in relation to the stoichiometric quantity with respect to the amine.

7. A process as defined in claim 1, wherein the reaction is carried out at substantially atmospheric pressure at a temperature of up to about 150° C.

8. A process as defined in claim 1, wherein the alcohol liberated is removed during the course of the reaction.

References Cited
UNITED STATES PATENTS
2,719,175   9/1955   Coover et al. _____ 260—562

HARRY I. MOATZ, Primary Examiner

U.S. Cl. X.R.
260—247.7, 268 C, 293.8, 518 R, 534 R, 558 R, 558 A, 561 R, 561 A, 562 R, 562 P, 562 A